June 4, 1940.   F. GIRARDI ET AL   2,202,950
GEARSHIFT MECHANISM
Filed Oct. 22, 1938   3 Sheets-Sheet 1
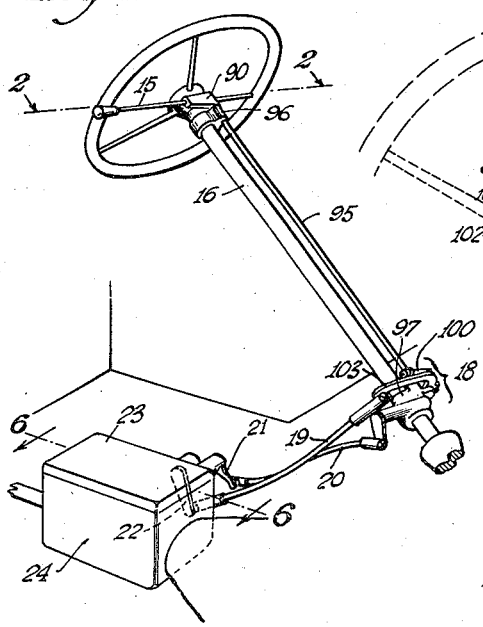
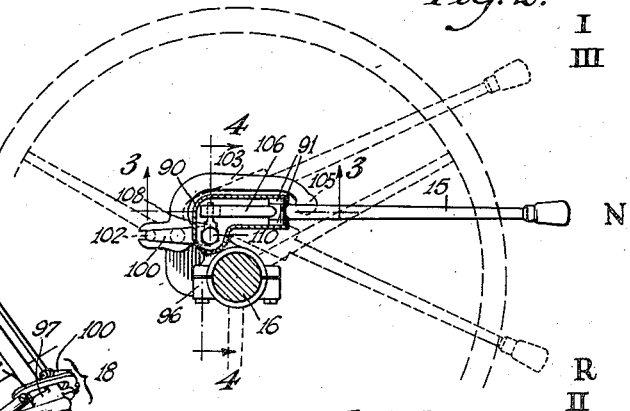
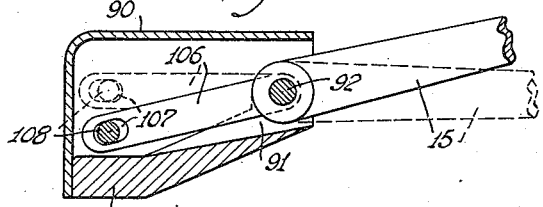
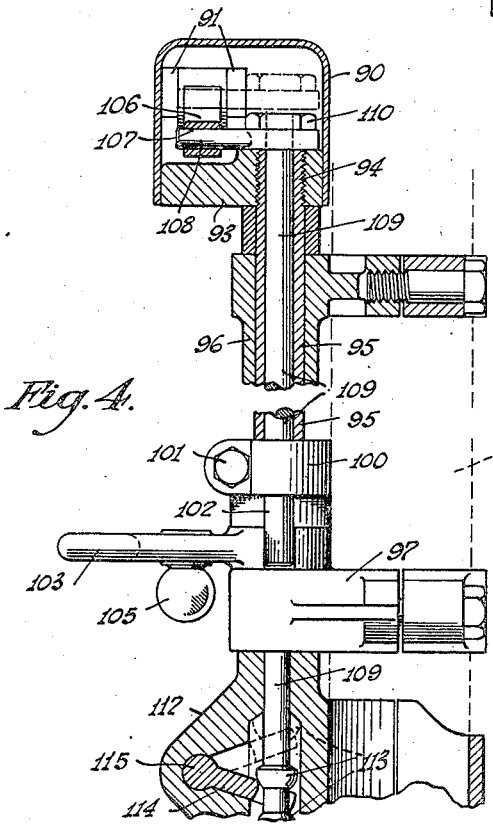
Frank Girardi
and Salvatore Cipullo
INVENTORS
BY Clarence E. Threedy
THEIR ATTORNEY.

June 4, 1940.  F. GIRARDI ET AL  2,202,950
GEARSHIFT MECHANISM
Filed Oct. 22, 1938  3 Sheets-Sheet 2

Frank Girardi
and Salvatore Cipullo
INVENTORS

BY Clarence E. Threedy
THEIR ATTORNEY.

June 4, 1940.        F. GIRARDI ET AL        2,202,950
                     GEARSHIFT MECHANISM
              Filed Oct. 22, 1938        3 Sheets-Sheet 3
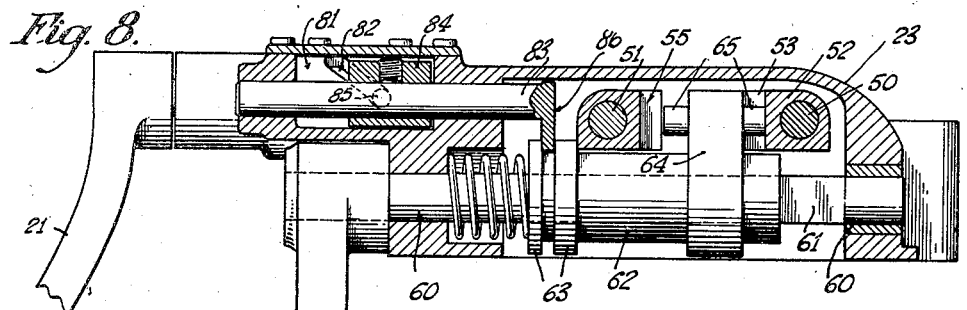
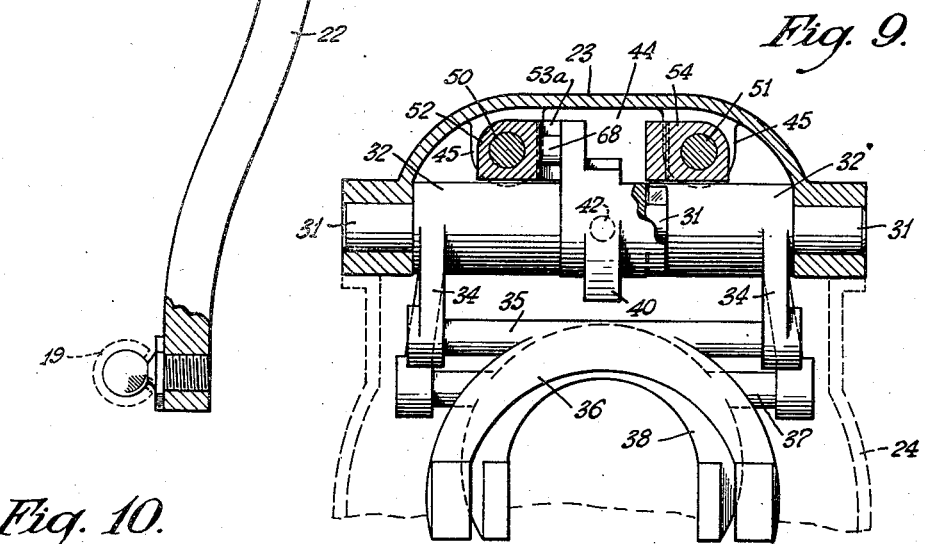
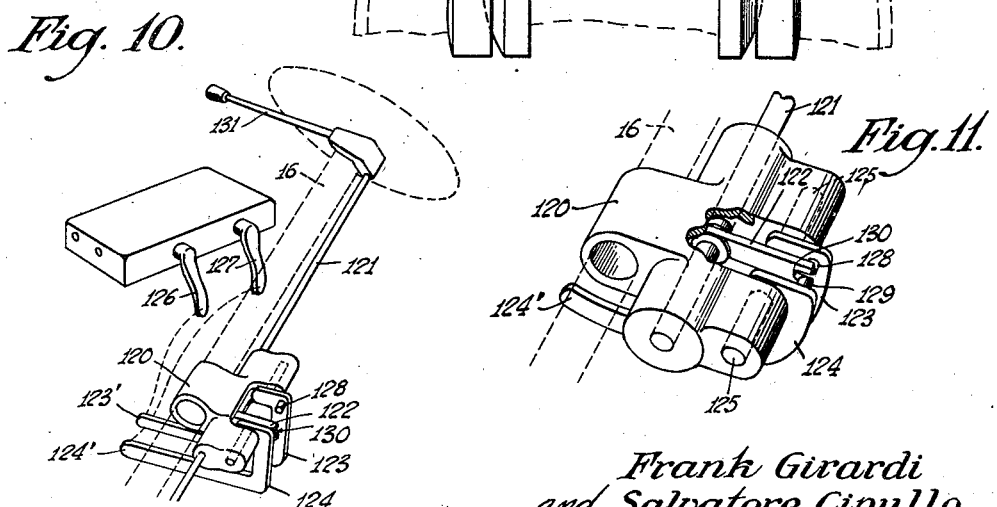
Frank Girardi
and Salvatore Cipullo
INVENTORS
BY *Clarence E. Threedy*
            THEIR ATTORNEY.

Patented June 4, 1940

2,202,950

UNITED STATES PATENT OFFICE 2,202,950

GEARSHIFT MECHANISM

Frank Girardi and Salvatore Cipullo, Chicago, Ill., assignors to Robert A. Dublin and Antonio Torretta, both of Chicago, Ill., as trustees Application October 22, 1938, Serial No. 236,454

5 Claims. (Cl. 74—473)

This invention relates to improvements in mechanical gear shifting devices particularly suited for use in automotive vehicles, and has as one of its principal objects the provision of gearshift mechanism adapted for operation by a small hand lever positioned on the steering post of the vehicle, the shifting mechanism being further adapted for cooperation with standard transmission gear sets.

Another object is the provision of gear shifting mechanism arranged and constructed as a unit for attachment to standard transmission gear sets, the unit being mounted in a member constructed to provide a cover for the gear set, which cover is substituted for the original cover and the manually operated shift lever arrangement customarily supplied in standard transmission gearshifts.

A further object is the provision of a gear shifting mechanism capable of producing a very high mechanical advantage or leverage for shifting the transmission gears so that only a relatively slight effort is required at the hand lever.

A further object is the provision of improved hand lever mechanism for attachment to the automobile steering post.

Still another object is the provision of improved intermediate coupling or motion translating means for interconnecting the hand lever with the gear shifting mechanism.

Yet another and more particular object of the invention is the provision of a gear shifting mechanism including, as a mounting base, a cover plate adapted for attachment to the top of the transmission gear set to replace the original cover plate, a plurality of shifting yokes arranged for rocking movement in cooperative engagement with the usual transmission gears, a number of sliding blocks severally connected with the yokes, and a simple arrangement of cooperating selecting and shifting cranks for shifting the blocks variously responsive to manipulation of the hand lever.

Viewed from another aspect, the invention provides a compact, sturdy, and powerful shifting mechanism which employs a pair of shifting blocks slidable in opposite parallel directions, a gear shifting yoke rocked by each block, a shifting crank for rocking the blocks, and a selecting crank and cooperating means for selectively interconnecting one of the shift blocks with the shifting crank.

Other novel aspects and objects of the invention reside in certain details of construction, operation, and arrangement of the illustrative embodiment hereinafter described in view of the drawings, in which:

Fig. 1 is a perspective schema of the steering post and control lever mounted thereon and means connecting the lever to the shifting mechanism;

Fig. 2 is a shifting diagram for the hand operating lever showing parts of the latter in horizontal section as viewed in the direction of line 2—2 of Fig. 1;

Fig. 3 is an enlarged vertical section through the hand lever housing, looking in the direction of line 3—3 of Fig. 2;

Fig. 4 is an enlarged vertical section through the hand lever connecting rod and translating mechanism, looking in the direction of line 4—4 of Fig. 2;

Fig. 5 is a perspective layout of the translating levers at the bottom of the steering post;

Fig. 8 is a transverse vertical section taken along line 8—8 of Fig. 6;

Fig. 9 is another transverse section taken along line 9—9 of Fig. 6;

Fig. 10 is a perspective schema illustrating a modified form of translating mechanism; while Fig. 11 is an enlarged perspective detail of the modified translating mechanism of Fig. 10.

Figure 6:
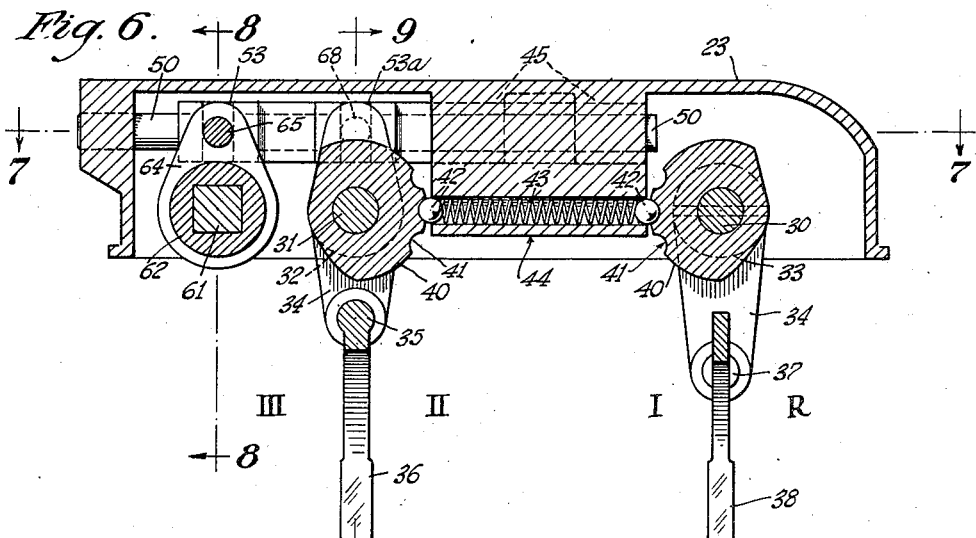
Fig. 6 is a vertical longitudinal section through the shifting mechanism attachment, taken along line 6—6 of Fig. 1.

Referring to Fig. 1, a preferred embodiment of the invention includes the provision of a hand shifting or operating lever 15 mounted on the steering post 16 of an automobile, close to the steering wheel, and arranged for both pivotal and rocking movement to effect selection of desired speeds in the transmission gear set, the rocking and pivotal movement of the hand lever being transmitted to the shifting mechanism through the agency of a translating means, generally indicated at 18, and mounted at the lower end of the steering post. The translating mechanism is connected with a pair of connecting rods 19 and 20 to a pair of operating cranks 21 and 22 mounted in a cover base 23 on the top of a standard transmission gear set 24. Manipulation of the handle 15 on the steering post will effect selective movement of either or both of the connecting rods 19 and 20 and consequent movement of the cranks 21 or 22 to select the desired gear ratio in the transmission gear set 24.

Figure 7:
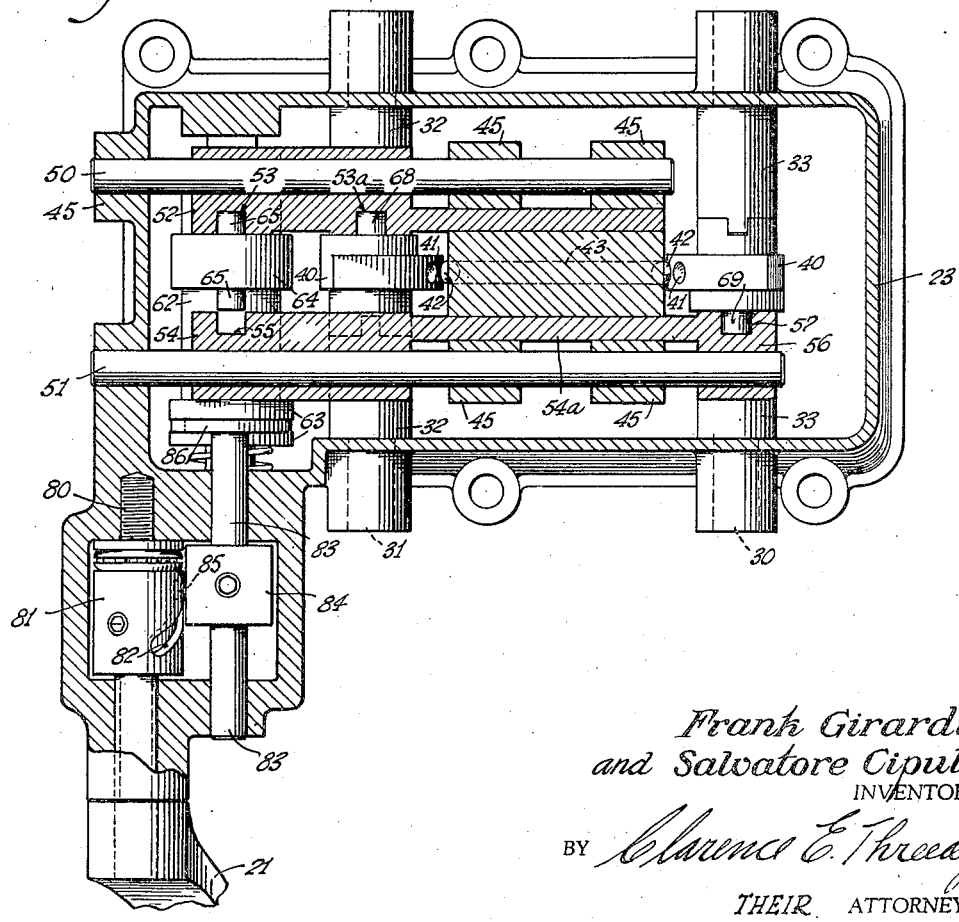
Fig. 7 is a horizontal section through the shifting attachment, as viewed along line 7—7 of Fig. 6.

The novel shifting mechanism, as shown in Figs. 6 and 7, includes a mounting member cast in the form of the cover plate 23 and adapted to fit as a cover plate on the standard transmission gear set box 24. Mounted on parallel cross shafts 30 and 31 are a pair of swinging sleeves 32 and 33 (see also Fig. 9), from each of which depends a pair of axially spaced arms 34, each pair of arms constituting trunnions in which are mounted rocking yoke shafts 35 and 37, respectively, a shifting yoke 36 depending from shaft 35, and a second shifting yoke 38 depending from shaft 37. By the foregoing arrangement, rocking movement of either of the sleeves 32 or 33 will effect corresponding movement of the associated yoke 36 or 38, the trunnion shaft arrangement for each yoke permitting the yokes to remain in a substantially vertical plane during movement thereof in opposite directions. When the cover plate 23 is mounted on the transmission box, the yokes 36 and 38 fit into operative engagement with corresponding shiftable transmission gears.

Each of the rocking sleeves 32 and 33 is provided with a radial extension 40 having a segmental portion in which are a plurality of suitably spaced recesses 41 adapted to receive detent members such as ball bearings 42 which are urged outwardly by a coil spring 43 arranged in a bore provided in a depending boss 44 formed on the inner side of the cover-plate mounting. The balls 42 constitute detents which are operable to effect snap action of the several rocking sleeves into various selected positions corresponding to certain gear speeds selected by operation of the hand lever.

Means for selectively actuating the gear shifting yokes includes the provision of a pair of shifting blocks 52 and 54 (Fig. 7) mounted on parallel guide rods 50 and 51, which in turn are mounted in bosses 45 cast in the cover plate, the blocks being slidable back and forth in a direction transverse to the rocking axes of the yokes. Two pin receiving slots 53 and 53a are provided in the block 52 for the reception of selective connecting pins to be described hereinafter, and similar pin slots 55 are provided in the block 54. Connected to the block 54 by a web 54a, is a block portion 56 in which there is a pin slot 57.

The yoke 36 (Figs. 6 and 7) is rocked by sliding movement of the block 52, which is connected with the yoke by a pin 68 extending from a radially offset part of the sleeve 32 on which the yoke 36 is trunnioned.

The yoke 38 may be rocked by a similar arrangement, this yoke having a pin 69 which couples with the slot 57 in the offset block part 56 of block 54 so that when the latter is moved back and forth, a rocking movement is imparted to yoke 38.

Means for selectively moving either of the shift blocks 52 or 54 includes the shifting crank or rocker 22 (Figs. 7 and 8) supported for rocking movement as at 60 in the cover plate casting 23 and having a keyed or squared shaft portion 61 on which is slidably mounted a selecting sleeve 62 provided with spaced collar or flange means 63 adapted to receive an operating yoke arranged on a companion selecting crank, shortly to be described.

Formed as a part of the selecting sleeve 62 is a short radial extension or arm 64 from which projects in opposite (axial) directions the opposite extremities 65 of a selecting pin, one end of which is positioned opposite the slot 53 in the slide block 52, and the opposite end of which is disposed opposite a slot 55 in block 54.

The arrangement is such that when the selecting sleeve 62 is displaced axially on the squared shaft 61, one or the other extremities 65 of the selecting pin will be moved into the slot 53 or 55 on one or the other connecting blocks on the guide rods 50 and 51, so that when the crank 22 is subsequently rocked, one or the other of the shift blocks will be moved.

When either of the shift blocks is thus moved by the crank 22, one or the other of the gear-moving yokes 36 or 38 will be selectively operated. If the shift block 52 is the one which is moved, such motion will be transmitted to the shifting yoke 36 through the medium of a connecting pin 68 mounted on the radial extension of yoke sleeve 32 so as to project into the slot 53a on the connecting block 52. If the block 54 is the one moved, such motion will be transmitted to the other shifting yoke 38 through the agency of a pin 69 projecting from the yoke sleeve 33 into the slot 57 on connecting block 56, which is attached to block 54 by the web 54a.

Means for effecting axial displacement or shifting of the selecting sleeve 62 (Figs. 7 and 8) includes the provision of a selecting crank 21 pivotally mounted on a pin 80 in the cover-plate casting 23 and having a rigid collar 81 in which there is cut a cam track 82. Mounted rigidly on a stud shaft 83 arranged for sliding movement in the cover-plate casting just above the spindle of the crank 22 (the latter is not seen in the view of Fig. 7), is another block or collar 84 from which a radial cam pin 85 projects into the cam track 82 in such manner that when the crank 21 is rocked, the stud shaft 83 will slide in a direction in and out of the cover plate, there being a yoke 86 arranged at the inner end of the stud shaft 83 for interfitting engagement with the collar formations 63 on the selecting sleeve.

Thus, rocking movement of the selecting crank 21 will cause the stud shaft 83 to shift axially and transmit such movement through the yoke 86 to the selecting sleeve 62, with a consequent projection of one or the other opposite ends of the connecting pin 65 into the corresponding slot 53 or 55 in the sliding connecting block. Thereafter the shifting crank 22 may be rocked to actuate the correspondingly selected gear-shifting yoke.

The manual control lever 15 and associated mechanism is of an improved construction which includes, as shown in Figs. 1 through 4, a housing 90 cast with a pair of spaced ears 91 in which the lever 15 is rockably mounted as at 92 (Fig. 3).

The housing is provided with a base 93 into which is threaded the upper end portion 94 of a torque tube 95 extending parallel with the steering post 16 through a bracket 96 attached to the latter just beneath the steering wheel. The tube 95 is arranged for rotation in the bracket 96 such that pivotal movement of the hand lever 15 in a plane substantially parallel with the steering wheel and hence transverse to the axis of the latter, will turn the tube 95.

At its lower end the torque tube 95 is pivotally supported in a bracket 97 attached to the steering post, and terminates in connection with a lever 100 (Fig. 5) clamped thereto by bolt means 101. From the free end portion of the torque tube lever a pin 102 projects into an eccentric seat in a dog leg lever 103 pivoted as at 104 on bracket 97. The opposite end of the dog leg has a ball and socket connection 105 with the shifting crank 22. When the hand lever 15 is turned (as distinguished from being rocked), the torque tube 95 turns the dog leg 103 and rocks the shifting crank 22.

Operation of the remaining selecting crank 21 is effected through rocking movement of the hand lever 15, and to this end there is provided a tail or extension 106 (Fig. 3) on the inner end of the hand lever 15. This extension has a slot 107 into which projects an end of an arm 108 rigidly secured to the upper end of a slide rod 109 by means such as the nut 110. The slide rod is movable within the torque tube 95 and extends down through the latter into a housing bracket 112, and has spaced collars 113 (Fig. 4) which fit into a yoke 114 on a crank shaft 115 journaled in the housing bracket 112 and terminating in a crank 116 having a ball and socket connection 117 with the connecting rod 20, which is connected at its opposite end with the selecting crank 21 on the shift mechanism.

By rocking the manual shift lever 15 up and down in the direction of the length of the steering post (as distinguished from turning the lever), the rod 109 will be slid back and forth in the torque tube and effect a rocking movement of the crank 116, it being recalled that turning movement of the hand lever will effect corresponding movement of the dog leg 103. In this manner, the cranks 21 and 22 may be selectively operated by various turning and rocking movements of the lever 15, as will be described more particularly hereinafter, it being pointed out that the leverages existing between the hand lever 15 and the shifting yokes 36 and 38, including the intervening mechanism, are such that a very great mechanical advantage is procured so that very little effort is required in actuating the hand lever 15 to procure relatively great power for shifting purposes in the yokes 36 and 38. The advantages of this in safely and easily driving the vehicle are obvious.

Operation

In operating the illustrative embodiment, the shift lever is disposed in lowered position, as shown in full lines in Fig. 2, corresponding to neutral gear "N." In order to shift into first speed, the operator will operate the clutch in the usual manner and he will raise the hand lever 15 to depress the slide rod 109, thus moving the yoke 114 in the bracket housing downwardly from dotted to full line position; this will result in an anti-clockwise movement of the crank 116 (Figs. 1 and 5) so that the connecting rod 20 will be moved toward the right (Fig. 1), thus moving the selecting crank 21 toward the right as seen in Fig. 1 and toward the left as viewed in Figs. 6 and 7, with the result that the cam track 82 will turn and urge the pin 85 to move the stud shaft 83 outwardly (Fig. 8 also), whereupon the selecting sleeve 62 will be slid toward the left, as seen in Fig. 8, or toward the bottom of the sheet as seen in Fig. 7, to project an end of the pin 65 into the block 54, whereupon the latter will be connected for operation by the shifting crank 22. The operator next moves the hand lever 15 forwardly (in a direction toward the top of the sheet, as viewed in Fig. 2, into the upper dotted line position, designated I); this turning movement will rotate the torque tube so as to move the dog leg 103 toward the right (Figs. 1 and 5) with a consequent rocking of the shifting crank 22 toward the left, as viewed in Fig. 7, so that the block 54 will move toward the right and rock the trunnion arms 34 and the attached yoke 38 toward the left, as seen in Fig. 6, thus moving the standard transmission gear into first speed, designated I. In order to select reverse gear, the hand lever 15 is first rocked as aforesaid and then moved back into the lower dotted line position indicated at R in Fig. 2, with the result that the yoke 38 will be moved toward the right instead of toward the left, thus selecting reverse gearing in the standard transmission set.

In order to select second speed, after having selected first speed in the manner aforesaid, the operator moves the hand lever down from the upwardly rocked, forward position back to neutral, lowering the hand lever to normal position as he does so and continuing movement of the hand lever back in normally lowered position to the lower dotted line position designated II ing Fig. 2; this merely rotates the torque tube 95 and moves the dog leg 103 to rock the shifting crank 22 while the selecting crank 21 remains in its normal position with the pin 65 on the selecting sleeve disposed in the slot 53 in the connecting block on slide rod 50, this latter rocking of the crank 22 being toward the right, as viewed in Fig. 7, so that the slide block 52 will move toward the left with a consequent movement of the yoke 36 toward the right into position II, thus selecting the standard second speed.

In order to shift to third from second as aforesaid, the shift lever 15 is moved from the lowered dotted line position of Fig. 2 (II) at its normally lowered level back to the forward dotted line position designated at III, thus turning the torque rod in the opposite direction without affecting the slide rod 109 so that the dog leg 103 is moved toward the right (Fig. 1), with a consequent movement of the shifting crank 22 toward the left, as viewed in Fig. 7, and since the selecting crank 21 is used in normal position (due to the hand lever being at the normally lowered level), the slide block 52 will be shifted toward the right with a consequent movement of the yoke 36 toward the left into third speed, designated III (Fig. 6).

A modified form of translating mechanism for connecting the hand lever with the shifting mechanism is illustrated in Fig. 11 and includes a housing bracket 120 secured to the lower end of the steering post 16 and through which a control rod 121 projects for engagement with an arm 122 keyed on the rod to turn with the same, the rod 121 being mounted for turning as well as axially shifting motion. A pair of rocker arms 123 and 124 are pivoted on shafts 125 and provided with free end portions or extensions 123' and 124' adapted for connection with cranks 126 and 127 in the gear shifting mechanism, the latter cranks corresponding to cranks which are mounted on the shafts 30 and 31 for individually rocking and shifting yokes 36 and 38, in the device of Fig. 7.

Mounted eccentrically of the pivotal axis of the translating rockers 123 and 124 are aligned pins 128 and 129 one of which is disposed in a slot 130 at the end of the arm 122 whenever the rod 121 is moved axially.

In operating the translating device of Figs. 10 and 11, a manual control lever 131 arranged for both turning and rocking movement, similarly to the lever 15, is manipulated to turn and slide the rod 121. When the lever 131 is in its normally lowered position, the arm 122 will be disposed in engagement with the pin 129 so as to rock the lever 124 when the handle 131 is turned. By rocking the operating lever, rod 121 may be moved upwardly to engage the slotted end 130 of arm 122 with the pin 128, thus permitting the translating arm 123 to be rocked.

The objects and advantages of the invention may be accomplished by other forms of construction, operation, and arrangement of parts than that set forth herein for purposes of illustration, and the invention is therefore not restricted to the details recited except as may be provided in the appended claims.

Having thus described our invention, what we claim as new and desire to protect by Letters Patent is:

1. Gear shifting mechanism for cooperation with transmission gears mounted on a transmission shaft of a transmission gear set, said mechanism comprising: a housing having a pair of parallel gear shifting shafts disposed transversely to said transmission shaft in spaced relationship therealong, a pair of gear shifting yokes mounted on said gear shifting shafts for rocking movement about the substantially parallel axes thereof, a pair of slide blocks mounted for parallel sliding movement in a direction transverse to the rocking axes of said yokes and parallel with said transmission shaft, means drivingly connecting each of said slide blocks with one of said yokes, a selective connecting member, selecting shaft means for supporting said connecting member for sliding movement between said slide blocks in a direction transverse thereto into and out of driving engagement with either one of said slide blocks, means for selectively moving said connecting member for the purpose aforesaid, and means for moving said connecting member in opposite directions substantially parallel to the axes of said slide blocks for rocking movement of a selected one of said shifting yokes.

2. Gear shifting mechanism for use with transmission gears mounted on a transmission shaft including a housing having a pair of spaced parallel gear shifting shafts disposed transversely of said transmission shaft, a pair of gear shifting members mounted on said gear shifting shafts and arranged for rocking movement about the parallel axes of said gear shifting shafts in spaced relationship along said transmission shaft, a pair of slide members mounted for sliding movement substantially side by side transversely of said gear shifting shafts and substantially parallel with said transmission shaft, each of said slide members having operative connection with one of said gear shifting members, a shifting crank shaft and a selecting crank shaft each extended transversely at one side of said slide members, a connecting device arranged for sliding movement in a direction transversely of said slide members on said shifting crank shaft, means on each of said slide members operatively engaged by said connecting device in response to the motion of the latter in opposite directions on said shaft toward one or the other of said members, said connecting device being keyed for rotation with said crank shaft and being operable, when the latter is turned, to slide one of said slide members with which said connecting device may be operatively engaged, whereby to move the corresponding gear shifting member, and cam mechanism operatively connected to said selecting crank shaft and responsive to the swinging thereof to effect sliding movement of said connecting device whereby to select the desired slide member.

3. Gear shifting mechanism for use with transmission gears mounted on a transmission shaft including a housing having a pair of spaced parallel gear shifting shafts disposed transversely of said transmission shaft, a plurality of gear shifting members mounted on said gear shifting shafts for oscillation about the parallel axes thereof and arranged in operative engagement with said transmission gears, reciprocable members mounted for movement transversely of said gear shifting shafts and substantially parallel with said transmission shaft and each having operative connection with one of said gear shifting members, a shifting crank mounted to rock about an axis transverse to the direction of movement of said reciprocable members, a coupling device mounted for sliding movement coaxially with the rocking axis of said shifting crank and arranged to be rocked by said crank, a selecting crank mounted to rock about an axis parallel to that of said shifting crank, a selecting cam operatively connected to said selecting crank shaft and a cam follower device arranged to operatively interconnect said coupling device and selecting cam and responsive to the swinging of said selecting crank to slide the coupling device back and forth for selective coupling with either of said reciprocable members for movement of the latter by said shifting crank.

4. A transmission gear shift including, in combination, shifting blocks mounted for reciprocation in parallelism for selective actuation of gear shifting means, a rocking shaft extending transversely of the direction of movement of said blocks, a coupling member mounted for axially shifting movement on said shaft for selective engagement with either of said blocks and also arranged to be oscillated by said rocking shaft, a shaft mounted for axial displacement in parallelism with said rocking shaft and operatively connected with said coupling member to move the latter back and forth as aforesaid, and cam means movable about an axis parallel with that of said last-mentioned shaft and operatively associated with the latter to effect back and forth movement of the same to shift said coupling member into operative engagement with one of said blocks responsive to movement of the cam means in opposite directions.

5. In a gear shifting device including reciprocable shifting members arranged for individual movement in parallelism, selecting and operating means including a rocking shaft extending transversely of the direction of movement of said shifting members, a selector member mounted for axially sliding movement on said rocking shaft into and out of engagement with each of said shifting members and also mounted for oscillatory movement with said rocking shaft to effect reciprocation of that one of said shifting members with which it is associated as aforesaid, a selecting shaft mounted for axial displacement in parallelism with said rocking shaft and operatively connected with said selector member to effect movement of the latter into and out of operative engagement with a desired one of said shifting members, and a second rocking shaft mounted for movement about an axis parallel with that of said first rocking shaft, and cam means oscillated by said second rocking shaft for coaction with cooperating cam means on said selecting shaft to effect displacement of the latter in opposite directions responsive to movement of said second rocking shaft in opposite directions, said rocking shafts being adapted for actuation by manual control means disposed on a steering wheel structure.

FRANK GIRARDI.
SALVATORE CIPULLO.